US012092995B2

(12) United States Patent
Hinaux et al.

(10) Patent No.: US 12,092,995 B2
(45) Date of Patent: Sep. 17, 2024

(54) TIMEPIECE RESONATOR INCLUDING AT LEAST ONE FLEXIBLE GUIDE

(71) Applicant: The Swatch Group Research and Development Ltd, Marin (CH)

(72) Inventors: Baptiste Hinaux, Lausanne (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 461 days.

(21) Appl. No.: 17/481,790

(22) Filed: Sep. 22, 2021

(65) Prior Publication Data

US 2022/0113677 A1 Apr. 14, 2022

(30) Foreign Application Priority Data

Oct. 8, 2020 (EP) .................................... 20200689

(51) Int. Cl.
*G04B 17/04* (2006.01)
*G04B 17/32* (2006.01)

(52) U.S. Cl.
CPC ........... *G04B 17/045* (2013.01); *G04B 17/32* (2013.01)

(58) Field of Classification Search
CPC ...... G04B 17/045; G04B 17/32; G04B 15/14; G04B 31/00; G04B 31/02
USPC .......................................................... 368/125
See application file for complete search history.

(56) References Cited

U.S. PATENT DOCUMENTS

2020/0150595 A1* 5/2020 Winkler ............... G04B 17/045
2020/0192291 A1* 6/2020 Winkler ............... G04B 17/045

FOREIGN PATENT DOCUMENTS

| | | | |
|---|---|---|---|
| CH | 715 641 | A2 | 6/2020 |
| CN | 105843026 | A | 8/2016 |
| CN | 105980938 | A | 9/2016 |
| CN | 107957672 | A | 4/2018 |
| CN | 109983409 | A | 7/2019 |
| CN | 110412854 | A | 11/2019 |
| CN | 110632838 | A | 12/2019 |
| CN | 111324027 | A | 6/2020 |
| WO | WO 2020/016131 | A1 | 1/2020 |

OTHER PUBLICATIONS

European Search Report issued Mar. 12, 2021 in European Application 20200689.6, filed on Oct. 8, 2020 (with English Translation of Categories of cited documents), 3 pages.
Combined Chinese Office Action and Search Report issued on Feb. 29, 2024 in Chinese Patent Application No. 202111170325.0 (with English translation of category of cited documents), 7 pages.

* cited by examiner

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A timepiece resonator including an inertial element moveable in relation to a fixed structure, and suspended to a flexible guide including flexible strips crossed in projection on a plane XY at a single crossing zone ZC, each one deformable in a plane parallel to the plane XY each one extending in a ribbon on either side of a neutral surface perpendicular to the plane XY and joining the first recess with the structure and the second recess with the inertial element, and including at least one rib asymmetrical in relation to its neutral surface, and, at the crossing zone ZC, either each flexible strip does not include any rib, or each rib is asymmetrical in relation to its neutral surface.

26 Claims, 5 Drawing Sheets

TIMEPIECE RESONATOR INCLUDING AT LEAST ONE FLEXIBLE GUIDE

CROSS-REFERENCE TO RELATED APPLICATION

This application claims priority to European Patent Application No. 20200689.6 filed on Oct. 8, 2020, the entire disclosure of which is hereby incorporated herein by reference.

FIELD OF THE INVENTION

The invention relates to a timepiece resonator including at least one inertial element moveable in relation to a fixed structure, and suspended to a flexible guide including flexible strips crossed in projection on a plane XY at a single crossing zone ZC, each one deformable in a plane parallel to the plane XY each one extending in a ribbon on either side of a neutral surface perpendicular to said plane XY and joining the first recess with said structure and the second recess with said inertial element.

The invention also relates to a timepiece, particularly a watch, including at least one such resonator.

The invention relates to the field of mechanical oscillator timepieces, and in particular the field of watches, where the flexible guides according to the invention make it possible to guarantee both the isochronism and the insensitivity to positions in space.

BACKGROUND OF THE INVENTION

Traditionally, a mechanical watch includes an oscillator including un sprung balance, which is responsible for the correct chronometric precision of the watch.

Schematically, the mechanical oscillator ensures three basic functions with:

guiding means, arranged to limit the degrees of freedom;

inertial means;

elastic return means.

More particularly for the sprung balance, these basic functions are performed by, respectively:

pivots, conventionally in ruby bearings;

the rim of the balance;

the spiral spring.

The precision of traditional mechanical watches is limited by the differences in friction of the pivots of the balance, according to the various positions that the watch may take in space.

Consequently, the aim is to develop oscillators devoid of friction pivots.

A very promising approach for eliminating the friction of pivots is that of oscillators with flexible guides, wherein a flexible guide fulfils two basic functions at the same time: on the one hand the guiding function and, on the other hand, the elastic return torque or force function.

In the case of the mechanical watch, preference is given to a rotary flexible guide, so that the translational shocks do not disturb the oscillator, and care is taken to place the centre of mass of the inertial element on the virtual axis defined by the flexible guide.

Non-limiting examples of rotary flexible guides are described in documents EP3035126, EP3206089, and EP18179623, all in the name of THE SWATCH GROUP RESEARCH & DEVELOPMENT Ltd. There is now a wide variety of rotary flexible guides the manufacture of which has been made possible by the LIGA and DRIE technologies.

In practice, to ensure the guiding function of such a flexible guide, it is known to use at least two flexible strips combined in parallel, such as for example in a pivot with strips crossed in projection. However, the most basic form of rotary flexible guide is a single strip that works in pure flexion, and which remains a solution not to be overlooked.

During a first approximation, if a substantially flat strip is subjected to a moment, it deforms according to an arc of circle, and its end defines an angle proportional to the applied moment. In reality, the bent strip has a slight anticlastic curvature. The anticlastic curvature is due to the fact that the fibres outside the neutral surface of the bending strip, must stretch and therefore, also contract in the directions orthogonal to the neutral surface, and, conversely, the fibres inside the neutral surface are contracted and therefore, extend orthogonally.

The extent of these orthogonal deformations is described by the Poisson's ratio. If the volume of the material is maintained, the Poisson's ratio equals 0.5. For most usual materials, the Poisson's ratio is closer to the value 0.3. The extent of the anticlastic curvature depends on the local bending curvature, the Poisson's ratio of the material, the ratios between the three main dimensions of the strip, and the geometries of the recesses.

The dependence of the anticlastic curvature at the bending angle causes, if no care is taken, a non-linearity in the relation between the bending angle and the applied moment.

This effect is very small, but for a mechanical watch oscillator, one thousandth of non-linearity results in an error in the order of 100 seconds per day of operation.

It should also be noted that it is sometimes desired to control the non-linearity rather than cancel it, in order, for example, to compensate for an anisochronism caused by the escapement used.

Document CH714 024 in the name of THE SWATCH GROUP RESEARCH & DEVELOPMENT Ltd describes a crossed strip resonator of which the angle and the crossing point are optimised in order to have a good isochronism, be invariant in the positions and obtain a long angular stroke, up to approximately 30°. Nevertheless, it is noted that for high aspect ratios of the strips, the anisochronism, that is to say the dependence of the rate at the amplitude, depends on the position in gravity, due to the variable inhibition of the anticlastic curvature along the strip. This limits the possible height of the strips, whereas a significant height is desirable for having good guiding.

Document CH714 031 in the name of THE SWATCH GROUP RESEARCH & DEVELOPMENT Ltd gets around this limitation by superposing a plurality of pivots of the same type, each one being of low height but the assembly having an improved out-of-plane stiffness thanks to the overall height. However, this requires a step of very precise assembly whereas a pivot with two strips can be manufactured in a single silicon SOI wafer.

Document EP3667432 in the name of ETA Manufacture Horlogère Suisse describes a pivot with two high height levels, by forcing the inhibition of the anticlastic curvature along the strip by adding ribs. The pivots of this class offer good chronometric properties, and in general have ribs that broadly superpose the centre: the covering surface has a wide radius. Yet this covering surface makes the strips difficult to separate in the case of a pivot manufactured in DRIE with two levels. Indeed, the intermediate oxide layer is eliminated by a chemical attack from the top, also to separate the strips it is necessary to rely on a sub-etching, which is all the more longer because the surface is large, and which modifies the shape of the part everywhere. It is therefore advantageous to find the narrowest possible isthmus. Other manufacturing by machining may also benefit from easier separation of the strips in the case of design of a narrower isthmus.

SUMMARY OF THE INVENTION

The invention proposes to design a rotary flexible guide pivot making it possible to obtain a resonator with good isochronism in all positions, good guiding, a long angular stroke and simplified manufacture.

The invention proposes to define a flexible guide for mechanical oscillators, which is subjected to the least possible anticlastic curvature.

The invention proposes to provide the flexible strip with a suitable relief, particularly ribs, in order to control the anticlastic curvature, without in as much significantly degrading the elastic performances of the flexible strip.

More particularly, a plurality of ribs are distributed along the flexible strip and extend over the height of it, in order to stiffen it to limit the anticlastic curvature, without significantly limiting its expected bending qualities.

The invention proposes the production of a flexible guide pivot micromanufactured on two levels, of which at least one strip of one level crosses a strip of the other level. These strips are ribbed in order to force the inhibition of the anticlastic curvature, and the ribs extend perpendicular to the strip on at least one first side of the strip (at a distance equal to at least the width of the strip). On the other side the ribs, are either absent, or extend less than the first side, so as to minimise the surface on which the two strips intersect in projection, and to facilitate their detachment.

To this end, the invention relates to a timepiece resonator according to claim 1.

Furthermore, thanks to the invention, it is easier and faster to manufacture the flexible guide pivot, and therefore the resonator, because there is little material to eliminate between the two strips at the crossing zone. Indeed, when the strips are manufactured on two different levels, for example in a silicon material, the two strips remain assembled with one another at the crossing of the strips. Thus, it is necessary to separate them by a complex process step. By avoiding having ribs in the crossing zone or by having asymmetrical ribs, the connection of the two strips is significantly reduced, such that it is easier to separate them, than in the case where ribs present in the crossing zone are symmetrical.

The invention also relates to a timepiece, particularly a watch, including at least one such resonator.

BRIEF DESCRIPTION OF THE DRAWINGS

Other features and advantages of the invention will become apparent upon reading the following detailed description, with reference to the appended drawings, wherein.

DETAILED DESCRIPTION OF PREFERRED EMBODIMENTS

Figure 1:
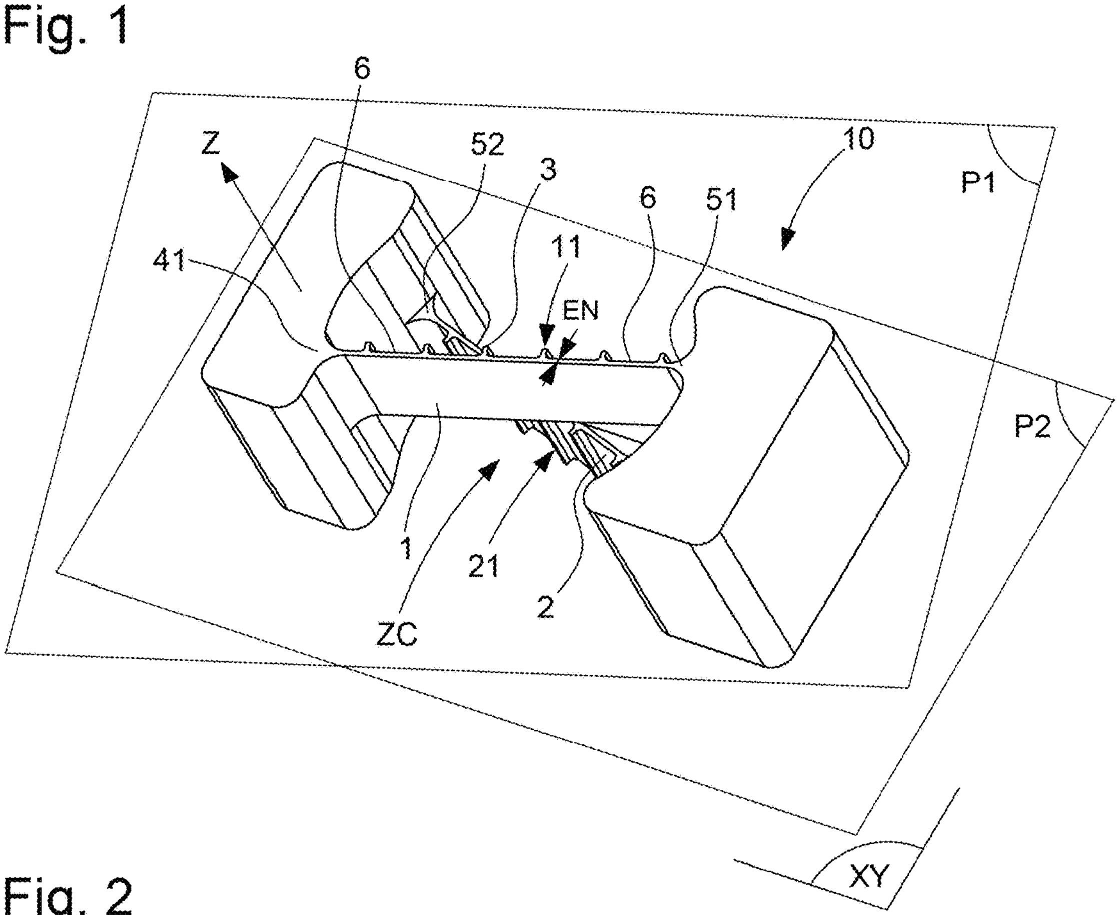
FIG. 1 shows, schematically, partial and in perspective view, a flexible guide included in a resonator according to the invention, which includes two flexible strips located in parallel planes, and which cross in projection on an projection plane XY parallel to these two planes; the supporting structure and the inertial mass suspended by the elastic strips are only briefly shown at the recesses of the flexible strips; this flexible guide relates to a first alternative implementation, where, at a projection crossing zone ZC, the flexible strips include on only one side ribs intended to limit the anticlastic curvature.
Figure 2:
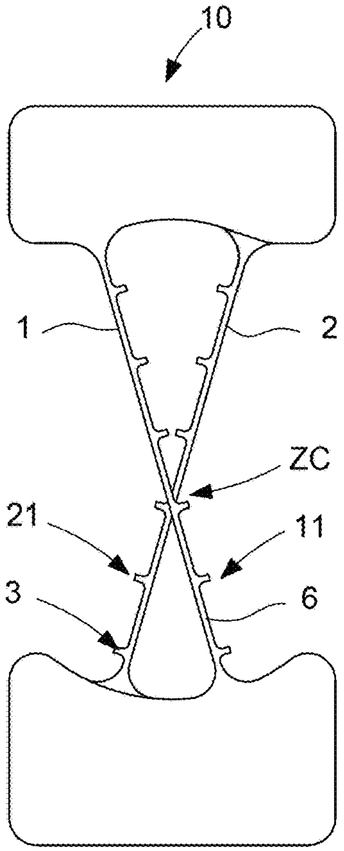
FIG. 2 is a plan view of the flexible guide of FIG. 1.
Figure 3:
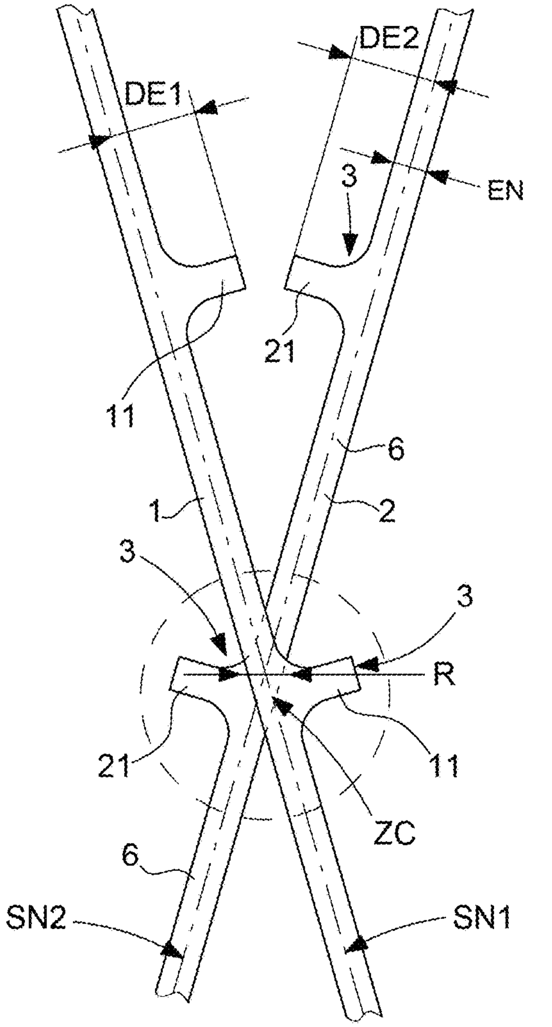
FIG. 3 is a detail of the crossing zone of the strips of FIG. 2.
Figure 4:
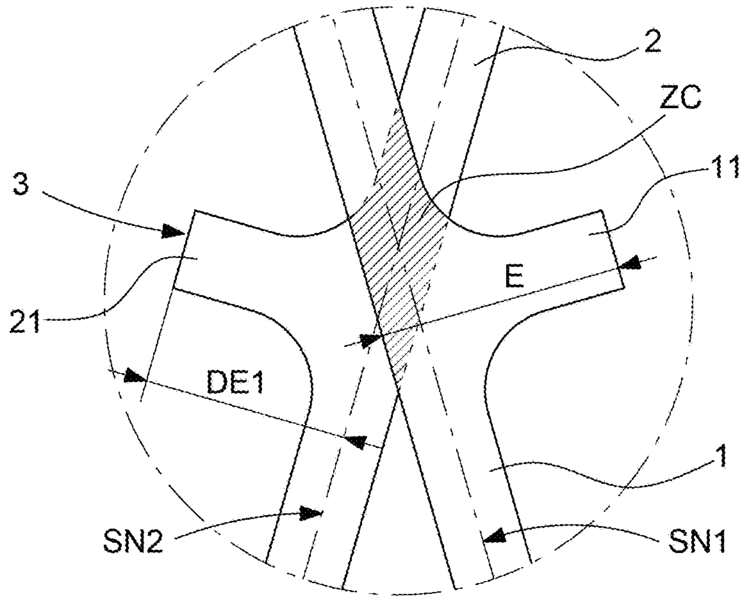
FIG. 4 is an even more enlarged detail of this same crossing zone, and where the hatchings show the superposition zone of the strips in a rest state.
Figure 5:
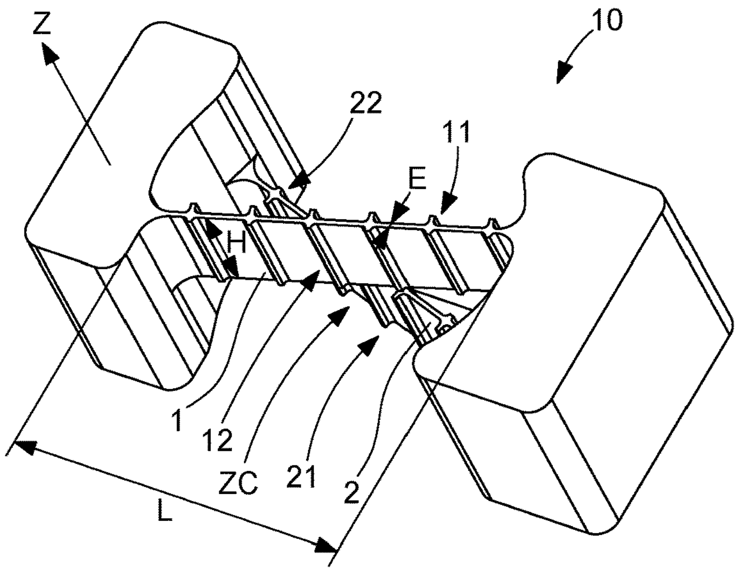
FIG. 5 shows, in a manner similar to FIG. 1, a second alternative implementation, where, at the crossing zone ZC in projection, the flexible strips include on their two sides ribs intended to limit the anticlastic curvature, these ribs being of unequal transverse extension.
Figure 6:
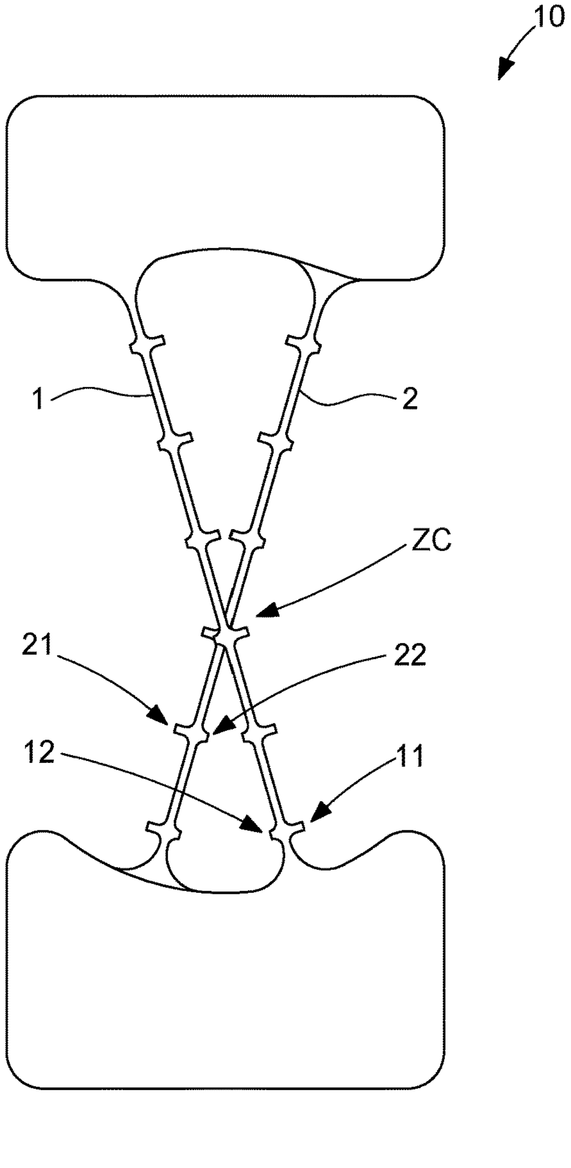
FIG. 6 is a plan view of the flexible guide of FIG. 5.
Figure 7:
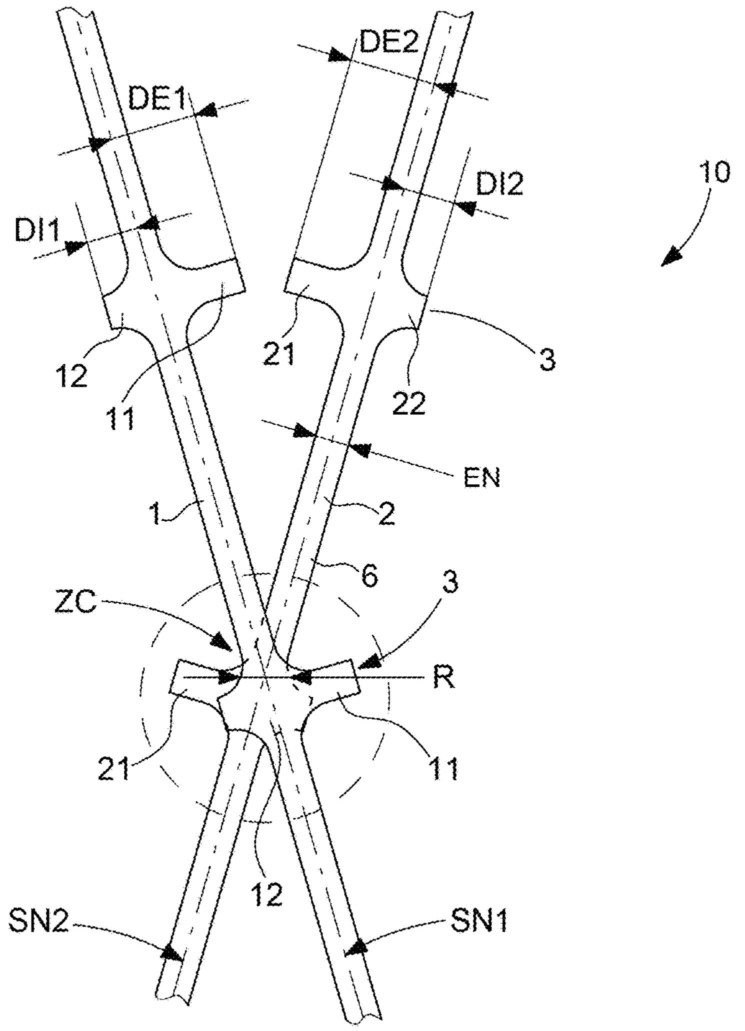
FIG. 7 is a detail of the crossing zone of the strips of FIG. 6.
Figure 8:
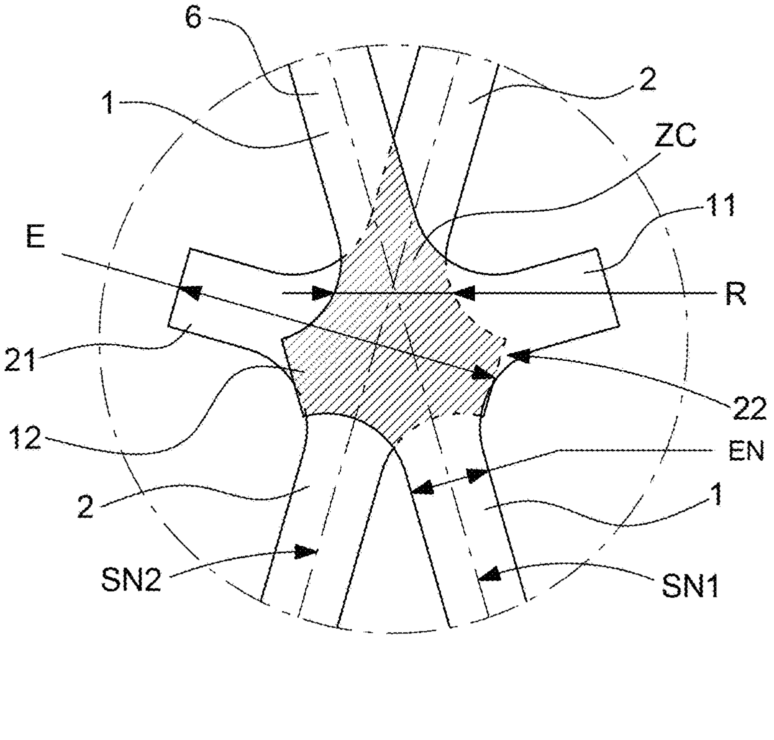
FIG. 8 is an even more enlarged detail of this same crossing zone and where the hatchings show the superposition zone of the strips in a rest state.
Figure 9:
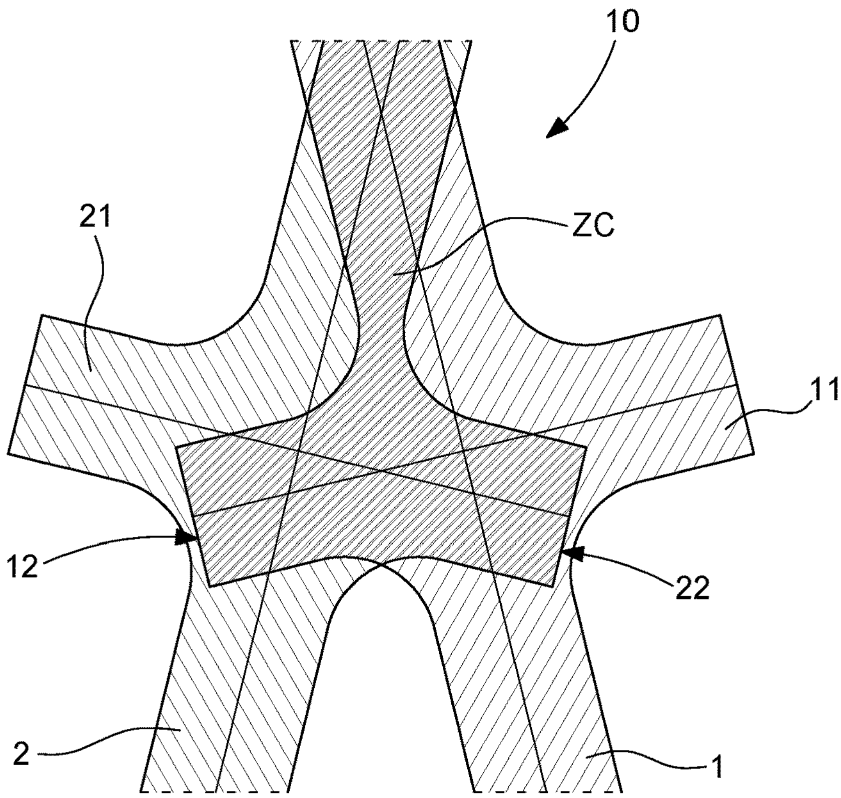
FIG. 9 illustrates a different configuration of the invention, where, at the crossing zone ZC in projection, the flexible strips include on their two sides equal ribs intended to limit the anticlastic curvature, and where the hatchings show the superposition zone of the strips in a rest state, which is much more extensive than in FIGS. 5 and 8 specific to the invention.
Figure 10:
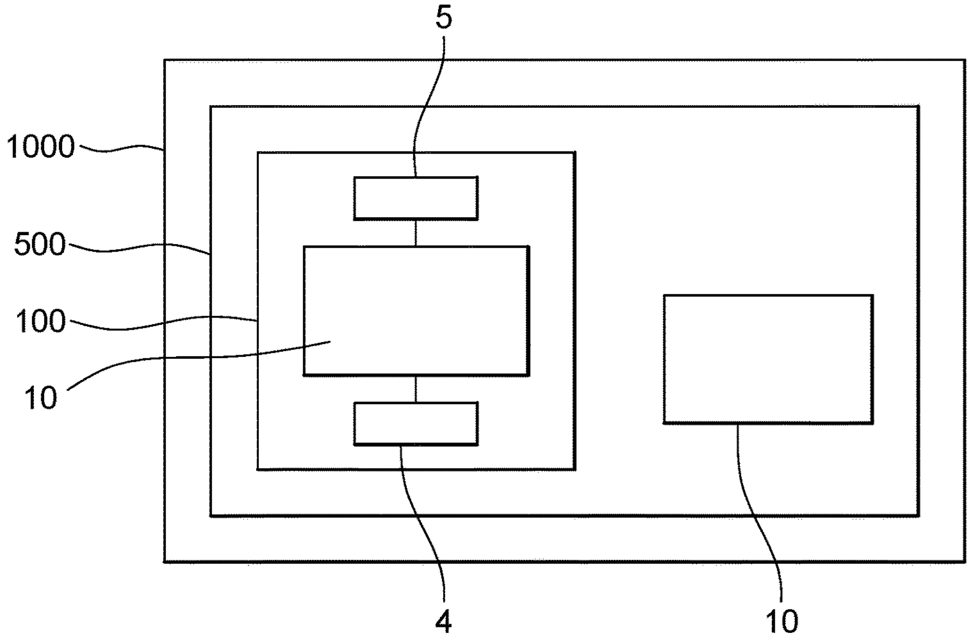
FIG. 10 is a block diagram showing a timepiece, particularly a watch, including a resonator according to the invention with at least one such flexible guide including flexible strips of geometry optimised against the anticlastic curvature.

The invention proposes to improve the control of the anticlastic curvature of the flexible strips included in a resonator flexible guide, by also enhancing the embodiments described by document EP3667432.

Thus, the invention relates to a timepiece resonator 100 including an inertial element 5 moveable in relation to a fixed structure 4, and that is suspended to at least one flexible guide 10 including flexible strips 1, 2, crossed in projection on a plane XY at a single crossing zone ZC. Each one of these flexible strips 1, 2, is deformable in a plane parallel to the plane XY. Each one extending in a ribbon on either side of a neutral surface SN1, SN2, perpendicular to the plane XY and joining on the one hand the first respective recess 41, 42, with the structure 4, and on the other hand and the second respective recess 51, 52, with the inertial element 5. In sum, the ribbon constitutes the core of the flexible strip 1, 2.

According to the invention, each flexible strip 1, 2, includes at least one rib 3, which is asymmetrical in relation to its neutral surface SN1, SN2. In addition, at the crossing zone ZC, either each flexible strip 1, 2, does not include any rib 3, or each rib 3 is asymmetrical in relation to its neutral surface SN1, SN2.

More particularly, the flexible guide 10 constitutes an elastic return means of the inertial element 5. This flexible guide 10 includes at least two flexible strips 1, 2, deformable in planes P1, P2, parallel with one another and parallel to the projection plane XY.

The structure 4 and the inertial element 5 are, each one, stiffer than each flexible strip 1, 2. Each flexible strip 1, 2, has its largest dimension called length L between its recesses 41, 42; 51, 52. Each flexible strip 1, 2, includes at least two sections 6 of constant thickness equal to a nominal thickness EN, which are separated by at least one relief 11, 12, respectively 21, 22, forming a rib 3 extending substantially in a direction Z orthogonal to the projection plane XY to limit the anticlastic curvature of the flexible strip 1, 2.

More particularly, at the crossing zone ZC, each rib 3 is asymmetrical in relation to its neutral surface SN1, SN2.

More particularly, each asymmetrical rib 3 includes an outer relief 11, 21, on the side opposite to each other strip the distal end of which is separated by an outer distance DE1, DE2, from the neutral surface SN1, SN2, and, facing the outer relief 11, 21, and on the side facing another strip, an inner relief 12, 22, the distal end of which is separated by an inner distance DI1, DI2, from the neutral surface SN1, SN2, which is less than the outer distance DE1, DE2.

More particularly, each flexible strip 1, 2, has, in a plane parallel to the projection plane XY, a second dimension E called thickness and that is less than the length L, and, in a direction Z orthogonal to the projection plane XY, a third dimension H called height and the value of which is between those of the length L and of the thickness E.

More particularly, at least one relief 11, 12, 21, 22, is protruding from the flexible strip 1, 2, which supports it by a value that is greater than half the smallest thickness of the flexible strip 1, 2, or the nominal thickness EN, to limit the anticlastic curvature of this flexible strip 1, 2, and the flexible strip 1, 2, includes, at a distance from its recesses, at least one rib 3 extending substantially in the direction Z.

More particularly, each rib 3 is separated from any neck included in the flexible strip 1, 2, by a value greater than or equal to the height H of the flexible strip 1, 2.

More particularly, at least one flexible strip 1, 2, is symmetrical in relation to the median plane parallel to the plane XY.

More particularly, each rib 3 includes at least one generatrix 31 that is farther from its neutral surface SN1, SN2, than the lateral surfaces of the sections 6 of the flexible strip 1, 2, located outside of the ribs 3. In addition, more particularly, the longitudinal extension LN of each rib 3 of the flexible strip 1, 2, in a direction joining the recesses 41, 42, respectively 51, 52 of the flexible strip 1, 2, is less than or equal to one fifth of the length L of the flexible strip 1, 2, between its recesses 41, 42, respectively 51, 52.

More particularly, at least one flexible strip 1, 2, includes a plurality of such sections 6 extending along its neutral surface SN1, SN2, and in the geometric extension of one another along the neutral surface SN1, SN2, with the same nominal thickness EN, each section 6 forming a ribbon the lateral surfaces 60 of which are parallel to the direction Z. In addition, in projection on the plane XY, at least two sections 6 are separated by a rib 3 of protruding thickness ES in relation to a lateral surface 60, the protruding thickness ES being greater than or equal to the nominal thickness EN. Yet more particularly, this protruding thickness ES is at least one and a half times greater than the nominal thickness EN.

More particularly, at least one flexible strip 1, 2, includes, at a distance from the first recess 41, 42, and from the second recess 51, 52, at least two ribs 3.

More particularly, at least one flexible strip 1, 2, is straight and includes its neutral surface SN1, SN2, which is flat in a strip direction D joining the first recess 41, 42, and the second recess 51, 52.

More particularly, at least one flexible strip 1, 2, includes at least one rib 3 that extends over the entire height H of the flexible strip 1, 2, in the direction Z.

More particularly, the height H of at least one flexible strip 1, 2, is less than or equal to one fifth of the length L of the flexible strip 1, 2, between its recesses 41, 42, respectively 51, 52.

More particularly, the transverse maximum thickness EM of the flexible strip 1, 2, is less than or equal to one fifth of the height H of this flexible strip 1, 2.

More particularly, the flexible strip 1, 2, forms a straight prism extending in the direction Z. Here, prism means a volume from the translation of a base surface, in a rectilinear or curvilinear direction, a straight prism being from the translation in a rectilinear direction. More particularly, the base of this prism in the plane XY is symmetrical in relation to the projection of the neutral surface SN1, SN2, in the plane XY.

More particularly, the longitudinal extension LN of each rib 3 of at least one flexible strip 1, 2, is less than or equal to the transverse protruding thickness ES of the rib 3.

More particularly, at least one rib 3 is a rectangular parallelepiped.

More particularly, at least one rib 3 is symmetrical in relation to the neutral surface SN1, SN2.

More particularly, at least one flexible strip 1, 2, includes, at a distance from the first recess 41, 42, and from the second recess 51, 52, a plurality of ribs 3 protruding alternately on either side of the sections 6.

More particularly, any projection of at least one flexible strip 1, 2, in its rest position, on the plane XY encompasses its neutral surface SN1, SN2.

More particularly, at least one flexible strip 1, 2, includes, at a distance from the first recess 41, 42, and from the second recess 51, 52, a plurality of ribs 3 regularly distributed in a longitudinal direction joining the recesses 41, 42, and 51, 52.

More particularly, at least one flexible strip 1, 2, includes, at a distance from the first recess 41, 42, and from the second recess 51, 52, a plurality of ribs 3, the number of which is greater than or equal to the difference between on the one hand the quotient L/H between the length L and the height H, and on the other hand one unit.

More particularly, the projection of at least one flexible strip 1, 2, on the plane XY includes, at all of the surface junctions, rounded neck-mouldings with a minimum radius value of 10 micrometres.

The figures show non-limiting, particular cases, where each one of the flexible strips 1, 2, includes, either ribs on one side of the strip ribbon, or all of the ribs that have the same transverse protrusion on the same side of the strip ribbon. These configurations are the most advantageous.

However, the invention essentially relates to the particular arrangement of the flexible strips at their crossing zone ZC in projection, to facilitate the development of the corresponding flexible guides 10. Therefore, the invention remains applicable to variants not illustrated, where the flexible strips 1, 2, include other rib arrangements: for example strips with ribs sometimes extending on one side and sometimes on the other side of the strip (for example outwardly before the crossing and on the other side after), or also alternating ribs, etc.

More particularly, at least one flexible strip 1, 2, is made of micromachinable material or of silicon temperature-compensated by a peripheral layer of silicon dioxide.

More particularly, at least one flexible strip 1, 2, is made by a DRIE or LIGA or similar process.

The invention also relates to a timepiece 1000 including at least one such timepiece resonator 100. More particularly, this timepiece 100 is a watch, in particular a mechanical watch.

The invention claimed is:

1. A timepiece resonator comprising:

an inertial element moveable in relation to a fixed structure, and suspended to at least one flexible guide including flexible strips crossed in projection on a plane XY at a single crossing point ZC, each flexible strip is deformable in a plane parallel to the plane XY, and each flexible strip extending in a ribbon on either side of a center region of the flexible strip perpendicular to said plane XY and joining a first recess with said structure and a second recess with said inertial element, wherein each said flexible strip includes at least one rib asymmetrical in relation to the center region of the flexible strip, wherein, at said crossing point ZC, either each said flexible strip does not include any rib, or each said rib is asymmetrical in relation to the center region, wherein each said asymmetrical rib includes an outer relief on a side opposite to each other said strip, a distal end of the outer relief is separated by an outer distance from said center region, and wherein each asymmetrical rib includes on a side facing another strip, an inner relief, a distal end of the inner relief is separated by an inner distance from said center region which is less than said outer distance.

2. The timepiece resonator according to claim 1, wherein, said flexible guide constitutes an elastic return means of said inertial element, said flexible guide comprising at least two said flexible strips deformable in planes parallel to one another and parallel to said projection plane XY, said structure and said inertial element each one being stiffer than each said flexible strip, each said flexible strip has its largest dimension called length L between the first recess and the second recess, each said flexible strip including at least two sections of constant thickness equal to a nominal thickness EN, which are separated by at least one relief forming said rib extending substantially in a direction Z orthogonal to said projection plane XY to limit the anticlastic curvature of said flexible strip.

3. The timepiece resonator according to claim 2, wherein each said flexible strip has, in a plane parallel to said projection plane XY a second dimension E called thickness and which is less than said length L, and, in a direction Z orthogonal to said projection plane XY, a third dimension H called height and the value of which is between those of said length L and said thickness E.

4. The timepiece resonator according to claim 2, wherein at least one said relief is protruding from said flexible strip which supports it, by a distance greater than half the smallest thickness of said at least one flexible strip or said nominal thickness EN, to limit the anticlastic curvature of said at least one flexible strip, and wherein said flexible strip includes, at a distance from the first recess and the second recess, at least one said rib extending substantially in said direction Z.

5. The timepiece resonator according to claim 3, wherein each said rib is separated from any neck included in said flexible strip, by a value greater than or equal to said height H of said flexible strip.

6. The timepiece resonator according to claim 1, wherein at least one said flexible strip is symmetrical in relation to a median plane parallel to said plane XY.

7. The timepiece resonator according to claim 2, wherein each said rib comprises at least one generatrix that is farther from its said central region than the lateral surfaces of said sections of said flexible strip located outside of said ribs, and wherein the longitudinal extension LN of each said rib of said flexible strip, in a direction joining said recesses of said flexible strip, is less than or equal to one fifth of said length L of said flexible strip between its said recesses.

8. The timepiece resonator according to claim 2, wherein at least one said flexible strip comprises a plurality of said sections extending along its said central region and in the geometric extension of one another along said central region with the same said nominal thickness EN, each said section forming the ribbon the lateral surfaces of which are parallel to said direction Z, and wherein, in projection on said plane XY, at least two said sections are separated by said rib of protruding thickness ES in relation to a said lateral surface, said protruding thickness ES being greater than or equal to said nominal thickness EN.

9. The timepiece resonator according to claim 8, wherein said protruding thickness ES is at least one and a half times greater than said nominal thickness EN.

10. The timepiece resonator according to claim 1, wherein at least one said flexible strip comprises, at a distance from said first recess and from said second recess, at least two said ribs.

11. The timepiece resonator according to claim 1, wherein at least one said flexible strip is straight and includes its said central region which is flat in a strip direction D joining said first recess and said second recess.

12. The timepiece resonator according to claim 3, wherein at least one said flexible strip comprises at least one said rib that extends over the entire height H of said flexible strip in said direction Z.

13. The timepiece resonator according to claim 3, wherein said height H of at least one said flexible strip is less than or equal to one fifth of said length L of said flexible strip between its said recesses.

14. The timepiece resonator according to claim 3, wherein the transverse maximum thickness EM of said flexible strip is less than or equal to one fifth of said height H of said flexible strip.

15. The timepiece resonator according to claim 2, wherein said flexible strip forms a straight prism extending in said direction Z.

16. The timepiece resonator according to claim 15, wherein the base of said prism in said plane XY is symmetrical in relation to the projection of said central region in said plane XY.

17. The timepiece resonator according to claim 8, wherein the longitudinal extension LN of each said rib of at least one said flexible strip is less than or equal to the transverse protruding thickness ES of said rib.

18. The timepiece resonator according to claim 1, wherein at least one said rib is a rectangular parallelepiped.

19. The timepiece resonator according to claim 1, wherein at least one said rib is symmetrical in relation to said central region.

20. The timepiece resonator according to claim 2, wherein at least one said flexible strip comprises, at a distance from said first recess and from said second recess, a plurality of said ribs protruding alternately on either side of said sections.

21. The timepiece resonator according to claim 1, wherein any projection of at least one said flexible strip, in its rest position, on said plane XY encompasses its said central region.

22. The timepiece resonator according to claim 1, wherein at least one said flexible strip comprises, at a distance from said first recess and from said second recess, a plurality of said ribs regularly distributed in a longitudinal direction joining said recesses.

23. The timepiece resonator according to claim 3, wherein at least one said flexible strip comprises, at a distance from said first recess and from said second recess, a plurality of said ribs, the number of which is greater than or equal to the difference between on the one hand the quotient L/H between said length L and said height H, and on the other hand one unit.

24. The timepiece resonator according to claim 1, wherein the projection of at least one said flexible strip on said plane XY includes, at all of the surface junctions, rounded neck-mouldings with a minimum radius value of 10 micrometres.

25. The timepiece resonator according to claim 1, wherein at least one said flexible strip is made of micromachinable material or silicon temperature-compensated by a peripheral layer of silicon dioxide.

26. A timepiece comprising at least one timepiece resonator according to claim 1.

* * * * *